US009555806B2

(12) United States Patent
Bulgrien et al.

(10) Patent No.: US 9,555,806 B2
(45) Date of Patent: Jan. 31, 2017

(54) SYSTEM AND METHOD FOR CONTROLLING ROLLBACK OF A WORK VEHICLE (75) Inventors: Garth Harvey Bulgrien, Ephrata, PA (US); Peter J. Dix, Naperville, IL (US); Pawel Kuros, Wood Dale, IL (US)

(73) Assignee: CNH Industrial America LLC, New Holland, PA (US)

( * ) Notice: Subject to any disclaimer, the term of this patent is extended or adjusted under 35 U.S.C. 154(b) by 53 days.

(21) Appl. No.: 14/413,460
(22) PCT Filed: Jul. 12, 2012
(86) PCT No.: PCT/US2012/046420
  § 371 (c)(1),
  (2), (4) Date: Jan. 8, 2015
(87) PCT Pub. No.: WO2014/011173
  PCT Pub. Date: Jan. 16, 2014

(65) Prior Publication Data
  US 2015/0158492 A1 Jun. 11, 2015

(51) Int. Cl.
  *B60W 30/18* (2012.01)
  *B60W 10/02* (2012.01)
  *B60W 10/103* (2012.01)
  *B60W 10/18* (2012.01)
  *F16H 63/48* (2006.01)
  *F16H 61/02* (2006.01)
  *B60W 10/101* (2012.01)
  (Continued)

(52) U.S. Cl.
  CPC ........ *B60W 30/18118* (2013.01); *B60W 10/02* (2013.01); *B60W 10/101* (2013.01);
  (Continued)

(58) Field of Classification Search
  CPC .................. B60W 2710/02; B60W 2710/182; B60W 10/02; B60W 10/10; B60W 10/182; B60W 2520/06; B60W 30/18118; B60W 2540/10; B60W 2540/12; B60W 2540/14
  See application file for complete search history.

(56) References Cited

U.S. PATENT DOCUMENTS 3,898,891 A * 8/1975 Colloton ................ B60K 23/00
                                                              180/336
4,855,913 A * 8/1989 Brekkestran ........ F16H 61/0246
                                                              477/80
(Continued)

FOREIGN PATENT DOCUMENTS

EP           1820707 A1    8/2007
EP           2341265 A1    7/2011
WO    WO 2011/112138 A1    9/2011

OTHER PUBLICATIONS

PCT International Search Report for PCT/US2012/046420, dated Apr. 3, 2013.

*Primary Examiner* — Ramya Burgess
*Assistant Examiner* — David Morris
(74) *Attorney, Agent, or Firm* — Rickard K. DeMille; Rebecca L. Henkel (57) ABSTRACT

A method for controlling rollback of a work vehicle may include receiving a signal indicating that a pedal of the work vehicle has been depressed, wherein the work vehicle is initially traveling in a first direction up an inclined surface such that at least one clutch of the transmission is engaged. In addition, the method may include reducing a pressure within the at least one clutch after receiving the signal in order to decelerate the work vehicle in the first direction and engaging a parking brake of the work vehicle as the work vehicle reverses direction and travels in a second direction down the inclined surface.

20 Claims, 5 Drawing Sheets

(51) Int. Cl.
*F16H 59/08* (2006.01)
*F16H 59/66* (2006.01)
*F16H 59/06* (2006.01)

(52) U.S. Cl.
CPC ........ *B60W 10/103* (2013.01); *B60W 10/182* (2013.01); *B60W 30/18045* (2013.01); *F16H 61/0246* (2013.01); *F16H 63/483* (2013.01); *B60W 2510/0241* (2013.01); *B60W 2520/06* (2013.01); *B60W 2540/12* (2013.01); *B60W 2710/182* (2013.01); *B60Y 2200/221* (2013.01); *F16H 2059/065* (2013.01); *F16H 2059/088* (2013.01); *F16H 2059/663* (2013.01); *F16H 2312/08* (2013.01); *F16H 2312/10* (2013.01)

(56) References Cited

U.S. PATENT DOCUMENTS

| | | | |
|---|---|---|---|
| 5,417,621 A | * | 5/1995 | Tibbles ................. B60W 10/02 477/39 |
| 6,942,595 B2 | * | 9/2005 | Hrazdera ............. A01B 61/025 180/53.6 |
| 7,063,638 B2 | | 6/2006 | Weeramantry |
| 7,771,314 B2 | * | 8/2010 | Eguchi ..................... B60T 7/02 477/109 |
| 2004/0166989 A1 | | 8/2004 | Carlsson |
| 2004/0180753 A1 | | 9/2004 | Takamura et al. |
| 2005/0059521 A1 | | 3/2005 | Funato et al. |
| 2009/0127012 A1 | * | 5/2009 | Leibbrandt ...... B60W 30/18118 180/170 |
| 2011/0144869 A1 | | 6/2011 | Dix et al. |

* cited by examiner

SYSTEM AND METHOD FOR CONTROLLING ROLLBACK OF A WORK VEHICLE

FIELD OF THE INVENTION

The present subject matter relates generally to work vehicles and, more particularly, to a system and method for controlling rollback of a work vehicle.

BACKGROUND OF THE INVENTION

Continuously variable transmissions (CVTs) utilizing a hydrostatic power unit are well known. A variety of work machines utilize this type of transmission for industries such as agriculture, earth moving, construction, forestry, and mining. During operation, fluid displacement of the hydrostatic power unit is varied to continuously change the output to input ratio of the transmission (i.e., the transmission ratio). This is accomplished by adjusting the angle of a swash plate of a variable displacement fluid pump or motor of the hydrostatic unit. One example of a CVT utilizing a hydrostatic power unit is described in U.S. Pat. No. 7,063,638 to Weeramantry, which is hereby incorporated by reference in its entirety herein for all purposes.

In order to control the speed of a work vehicle, it is known to have a CVT operably connected to a clutch or "inching" pedal. For example, an operator may be permitted to slow down or stop a work vehicle by simply depressing the inching pedal. When the pedal is depressed, the pressure within an engaged clutch of the transmission may be reduced, which results in slippage of the clutch and less torque being transferred through the transmission. However, while the inching pedal provides an effective means of slowing down a work vehicle, its use can be problematic when the vehicle is operating on an inclined surface (e.g., a hill). In such instances, when the inching pedal is depressed and the work vehicle decelerates, the vehicle may actually reverse directions and begin to roll down the inclined surface. To control such "rollback" of the vehicle, conventional control methods typically require that a shuttle shift be performed as the vehicle reverses directions by swapping directional clutches within the transmission, such as by swapping from the forward directional clutch to the reverse directional clutch). Unfortunately, these control methods make it difficult to control the motion of the vehicle as it reverses directions. For example, the change in torque required to perform the shuttle shift often results in jerky motion that can be felt by the operator.

Accordingly, an improved system and method for controlling rollback of a work vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling rollback of a work vehicle having a transmission. The method may include receiving a signal indicating that a pedal of the work vehicle has been depressed, wherein the work vehicle is initially traveling in a first direction up an inclined surface such that at least one clutch of the transmission is engaged. In addition, the method may include reducing a pressure within the clutch after receiving the signal in order to decelerate the work vehicle in the first direction and engaging a parking brake of the work vehicle as the work vehicle reverses direction and travels in a second direction down the inclined surface, wherein the work vehicle travels in the second direction without engaging an opposite directional clutch of the transmission.

In another aspect, the present subject matter is directed to a system for controlling rollback of a work vehicle operating on an inclined surface. The system may generally include a transmission having at least one clutch and a parking brake. The transmission may be configured such that the clutch is engaged as the work vehicle travels up the inclined surface in a first direction. The system may also include a pedal configured to be depressed by an operator of the work vehicle. In addition, the system may include a controller communicatively coupled to the transmission and the pedal. The controller may be configured to receive a signal indicating that the pedal has been depressed, reduce a pressure within the clutch after receiving the signal in order to decelerate the work vehicle in the first direction and engage the parking brake as the work vehicle reverses direction and travels in a second direction down the inclined surface, wherein the work vehicle travels in the second direction without engaging an opposite directional clutch of the transmission.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling rollback of a work vehicle. Specifically, the disclosed method allows for controlled rollback of the work vehicle on an inclined surface (e.g., a hill) without requiring a shuttle shift to be performed (i.e., without requiring the directional clutches to be swapped). For example, in several embodiments, the pressure within an engaged clutch of the transmission (e.g., a directional or range clutch of the transmission) may be reduced when an inching pedal of the work vehicle is depressed, thereby causing the clutch to slip and the vehicle to decelerate as it travels up the inclined surface. As the vehicle reverses direction (i.e., begins to roll down the inclined surface) a parking brake of the work vehicle may be applied or otherwise engaged to control the rollback of the work vehicle. This allows for the torque carrying function within the transmission to be transferred from the slipping clutch to the parking brake as the work vehicle begins to roll back.

As will be described below, the parking brake may be used to both control the speed of the work vehicle as it rolls back and slow the work vehicle as the inching pedal is released. In particular, as the work vehicle rolls back while the inching pedal. is depressed, the pressure within the parking brake may be regulated to control the speed of the vehicle. For example, the pressure within the parking brake may be regulated as a function of the transmission ratio to ensure that the speed of the work vehicle is maintained at or below a predetermined speed limit (e.g., about 1 kilometer per hour (KPH)). Similarly, when the inching pedal is released, the pressure within the parking brake may be regulated in a manner that slows the vehicle down, thereby allowing for a smooth re-engagement of the driveline. For example, in embodiments in which a range clutch of the transmission is initially slipped upon depression of the inching pedal, the parking brake may be used to slow the work vehicle when the inching pedal is subsequently released to allow the range clutch to be re-engaged.

It should be appreciated that numerous advantages may be provided by controlling rollback using the parking brake as opposed to slipping a clutch of the transmission. For example, the parking brake may be capable of dissipating more energy than the clutch, thereby allowing the parking brake to control rollback at greater vehicle speeds without overheating. In addition, the parking brake may be used to control rollback without affecting certain operating features of the work vehicle. For example, work vehicles may include an operating feature in which the currently engaged range clutch is electrically disconnected when the inching pedal is near fully depressed, thereby providing a means of disconnecting the driveline in the event of a system fault. This is often achieved by including an electrical switch on the pedal linkage that is designed to cut-off power to the range clutch. By implementing the disclosed methods, the rollback of the work vehicle may be carefully controlled even when the inching pedal is depressed below the point at which the power to the range clutch is cut-off. Moreover, since the pressure within the range clutch takes time to ramp-up after its power has been cut-off, the parking brake may, as indicated above, be used to slow the work vehicle down as the inching pedal is being released to allow the range clutch to be re-engaged.

Figure 1:
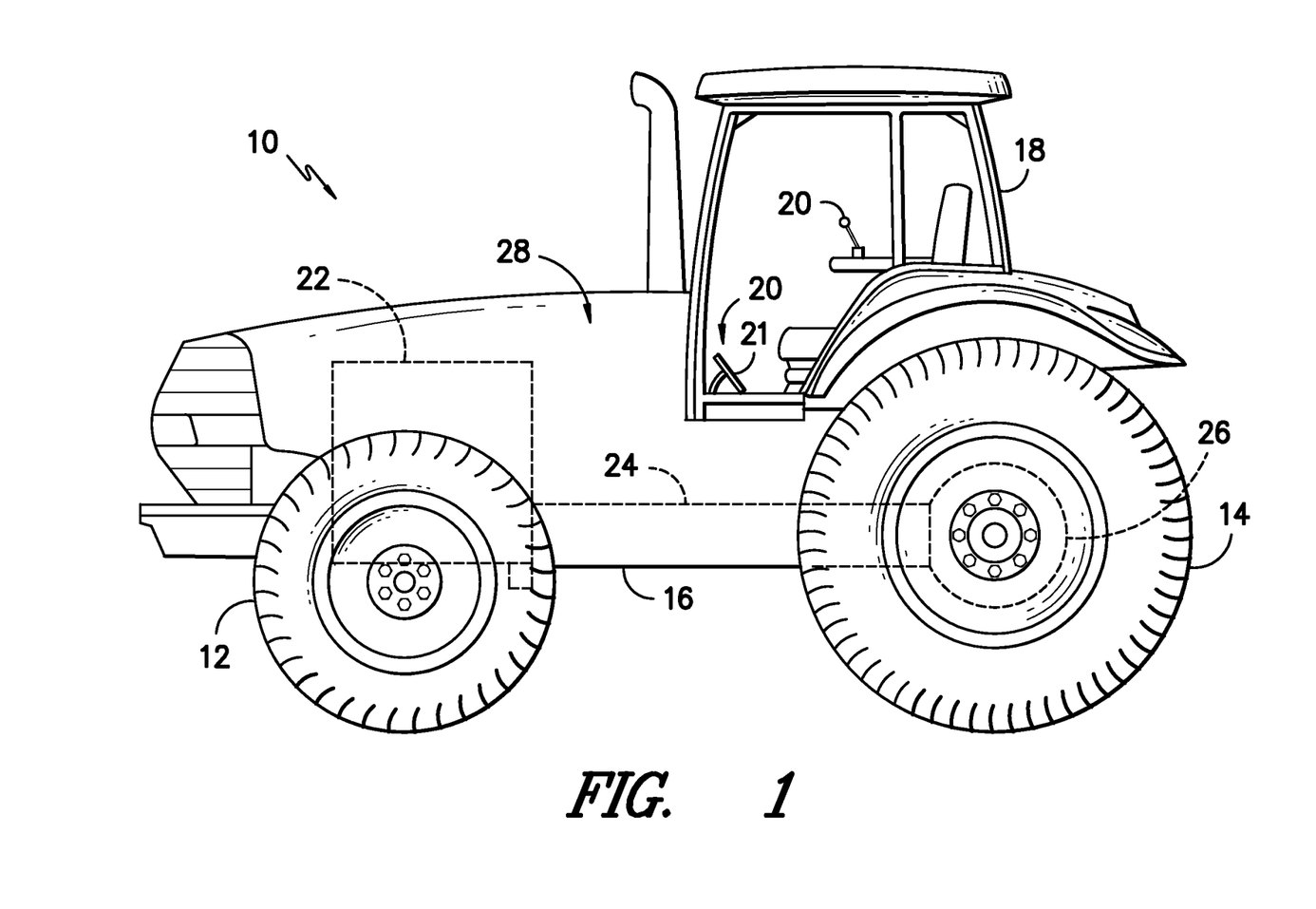
FIG. 1 illustrates a side view of one embodiment of a work vehicle.

Referring now to the drawings, FIG. 1 illustrates a side view of one embodiment of a work vehicle 10. As shown, the work vehicle 10 is configured as an agricultural tractor, However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20 (e.g., levers, pedals, control panels and/or the like) for permitting an operator to control the operation of the work vehicle 10. For instance, one of the input devices 20 may comprise a clutch or inching pedal 21 configured to allow the operator to move the vehicle 10 small distances as well as to slow down or stop the vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via an axle/differential 26. The engine 22, transmission 24, and axle/differential 26 may collectively define a drive train 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the engine 22, transmission 24, and differential 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Figure 2:
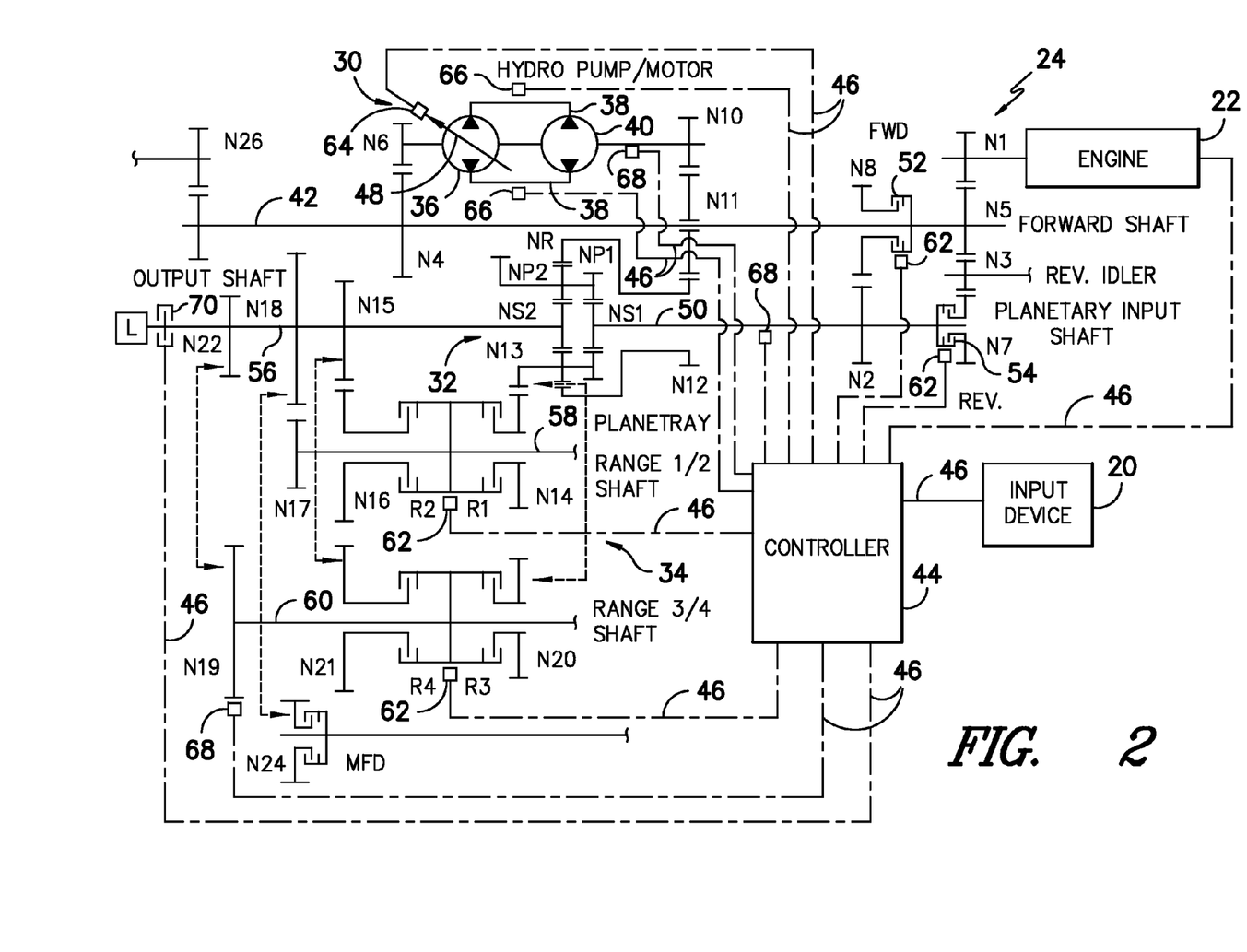
FIG. 2 illustrates a schematic view of one embodiment of a continuously variable transmission suitable for use within the work vehicle shown in FIG. 1.

Referring now to FIG. 2, a simplified, schematic diagram of one embodiment of a continuously variable transmission 24 suitable for use with the work vehicle 10 described above is illustrated in accordance with aspects of the present subject matter. As shown, the transmission 24 may include a hydrostatic power unit 30 and a planetary power unit 32. The hydrostatic power unit 30 and the planetary power unit 32 may be coupled to a driveline including a range gear set 34 and may also be coupled to a load L. Far example, in one embodiment, the load L may correspond to the drive wheels of the work vehicle 10 (e.g., the front and/or rear wheels 12, 14 of the work vehicle 10). Alternatively, the hydrostatic power unit 30 and the planetary power unit 32 may be coupled to any other suitable load L, such as loads that include a track drive or a separate operating system of the work vehicle 10 (e.g., a power take off (PTO)).

The hydrostatic power unit 30 of the transmission 24 may generally include a fluid pump 36 coupled by fluid conduits 38 in a closed loop to a fluid motor 40. The motor 40 may be coupled to the engine 22 via an input gear N6. Specifically, as shown in FIG. 2, power may be transmitted to the hydrostatic power unit 30 by a driven gear N4 mounted on a forward shaft 42 of the transmission 24 and engaged with the input gear N6. In addition, an output gear N10 for the hydrostatic. power unit 30 may be connected to a ring gear NR of the planetary power unit 32 via gears N11 and N12.

In general, the pump 36 may comprise any suitable electronically controlled pump known in the art, such as an electronically controlled variable displacement hydraulic pump. As such, operation of the pump 36 may be automatically controlled using an electronic controller 44 of the work machine 10. For example, as shown in FIG. 2, the controller 44 may be communicatively coupled to the pump 36 via a suitable communicative link 46 so that the angle of a swash plate of the pump 36 (the swash plate being denoted by a diagonal arrow 48 through pump 36) may be adjusted through a range of positions, thereby adjusting the transmission ratio of the transmission 24.

It should be appreciated the controller 44 may generally comprise any suitable processor-based device known in the art. Thus, in several embodiments, the controller 44 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic, controller (PLC), an application specific integrated circuit, and other programmable circuits. Additionally, the memory device(s) of the controller 44 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 44 to perform various computer-implemented functions, such as the methods 100, 200 described below with reference to FIGS. 4 and 5. In addition, the controller 44 may also include various other suitable components, such as a communications circuit or module, one or more input/output channels, a data/control bus and/or the like.

Referring still to FIG. 2, the planetary power unit 32 of the transmission 24 may generally include a primary sun gear NS1 mounted on a planetary input shall 50.

As shown, the planetary input shaft 50 may be coupled to the engine 22 via a forward directional clutch 52 or a reverse directional clutch 54. In addition, the planetary power unit 32 may be configured to be selectively coupled to the load L, coupled to the hydrostatic power unit 30 and selectively coupled to the engine 22, all under automatic control of the controller 44. For example, for coupling the planetary power unit 32 to the load L, the transmission 24 may include an output shaft 56 coupled to the load L which carries an input gear N18 engaged with an output gear N17 on a range ½ shaft 58 of the range gear set 34 and a gear N22 engaged with a gear N19 on a range ¾ shaft 60 of the range gear set 34. The range ½ shaft 58 may, in turn, be coupled to the planetary power unit 32 via automatic operation of range selectors or clutches R1 and R2 for power flow through gears N13 and N14, or N15 and N16, respectively. Similarly, the range ¾ shaft 60 may be coupled to the planetary power unit 32 via range selectors or clutches R3 and R4 for power flow via gears N13 and N20, or N15 and N21, respectively. The range ½ and ¾ shafts 58, 60 may also be simultaneously coupled to the planetary power unit 32 to provide dual power flow. It should be appreciated that operation of the various clutches (e.g., the forward directional clutch 52, the reverse directional clutch 54, and clutches R1, R2, R3 and R4) may be automatically controlled by the controller 44 using suitable actuators 62 communicatively coupled to the controller 44 via suitable communicative links 46.

The controller 44 may also be communicatively coupled to a swash plate actuator 64 for automatically controlling the angle of the swash plate of the pump 36. For example, the actuator 64 may be configured to move the swash plate across a range of angles in response to control signals received from the controller 44. In addition, the controller 44 may be coupled to any number of sensors for monitoring the various operating parameters of the transmission 24 including, but not limited to, pressure sensors 66 for sensing the pressure within the conduits 38 connecting the pump 36 to the motor 40 and/or for sensing the pressure of the hydraulic fluid within the various clutches of the transmission 24, speed sensors 68 for sensing speeds of the various shafts of the transmission 24 and/or any other suitable sensors. Similarly, the controller 44 may also be connected to the engine 22 a speed governor of the engine 22) for receiving engine speed data and other information therefrom.

Additionally, as shown in FIG. 2, the controller 44 may also be communicatively coupled to the operator-controlled input device(s) 20 positioned. within the cab 18 via a suitable communicative link 46. For example, the controller 44 may be coupled to the inching pedal 21 of the work vehicle 10. As such, the controller 44 may be configured to receive a signal indicating the degree to which the inching pedal 21 has been depressed by the operator, which may then permit the controller 44 to take appropriate actions in response to the amount of pedal depression. For example, as will be described below, in several embodiments, the controller 44 may be configured to reduce the pressure within the currently engaged range clutch of the transmission 24 (e.g., range clutch R1) in response to the inching pedal 21 being depressed.

During operation, the transmission 24 may be operated to have a combined hydrostatic and mechanical power flow by engaging the reverse directional clutch 54 to the power planetary power unit 32 via gears N1, N3, N5 and N7, or engaging the forward directional clutch 52 to power the power planetary power unit 32 via gears N1, N8, and N2. Alternatively, the transmission 24 may be operated to have a pure hydrostatic power flow by disengaging both of the directional clutches 52, 54. Regardless, the transmission 24 may provide a seamless transition between ranges to provide work/road configurations as desired. In particular, speed changes from zero to the maximum speed within each speed range of the transmission 24 may be achieved in a smooth and continuous manner by automatically changing the swash plate angle of the pump 36 via control signals transmitted from the controller 44. For each speed range, substantially the full range of travel of the swash plate may be used. For example, as will be described below with reference to FIG. 3, the swash plate may be at one end of its range of travel for zero speed within a specific speed range, may be at the other end of its range of travel for the maximum speed of that speed range and may be at a zero tilt or neutral position within its range of travel for an intermediate speed of that same speed range.

Referring still to FIG. 2, the transmission 24 may also include a parking brake 70 operably positioned on the load shaft 56. In several embodiments, the parking brake 70 may be communicatively coupled to the controller 44 (via a suitable communicative link 46) for automatic control thereof. For example, the controller 44 may be configured to proportionally or gradually engage the parking brake 70 as well as gradually release or disengage the parking brake 70. In such embodiments, the pressure of the hydraulic fluid supplied to the parking brake 70 may be controlled using an automatic valve 72 (e.g., a proportional pressure reducing valve) configured to be operated via control signals transmitted from the controller 44. As is generally understood, the parking brake pressure may be inversely related to the parking brake torque. Thus, contrary to the various clutches of the transmission 24, the parking brake 70 may be designed such that it is engaged when the pressure within the brake 70 is reduced and disengaged when the pressure within the brake 70 is increased, In addition, for operation When the controller 44 is not powered or is not properly functioning, the parking brake 70 may also be configured to be engaged using a separate means. For instance, the parking brake 70 may be spring applied or may include any other suitable biasing means configured to bias the parking brake 70 into engagement. Alternatively, the parking brake 70 may include a suitable mechanical means for engaging the brake 70 when the controller 44 is not powered or is not properly functioning. Moreover, a means may be provided to store pressurized hydraulic fluid in the event the engine 22 stalls so that the parking brake 70 may remain released and/or may be applied and released several times if needed to control the vehicle 10 until the engine 22 can be restarted. Additionally, other means (e.g., a hand pump) may be provided to disengage the parking brake 70 if there is a fault and no stored pressurized hydraulic fluid is left within the system.

It should be appreciated that the configuration of the transmission 24 shown in FIG. 2 simply illustrates one example of a suitable transmission with which the disclosed system and method may be utilized. Thus, one of ordinary skill in the art should appreciate that application of the present subject matter need not be limited to the particular transmission 24 shown in FIG. 2, but, rather, the present subject matter may be advantageously used with various types/configurations of transmissions. For example, in addition to a continuously variable transmission, the disclosed system and method may also be advantageously applied to control the rollback of a work vehicle including a power shift transmission.

Figure 3:
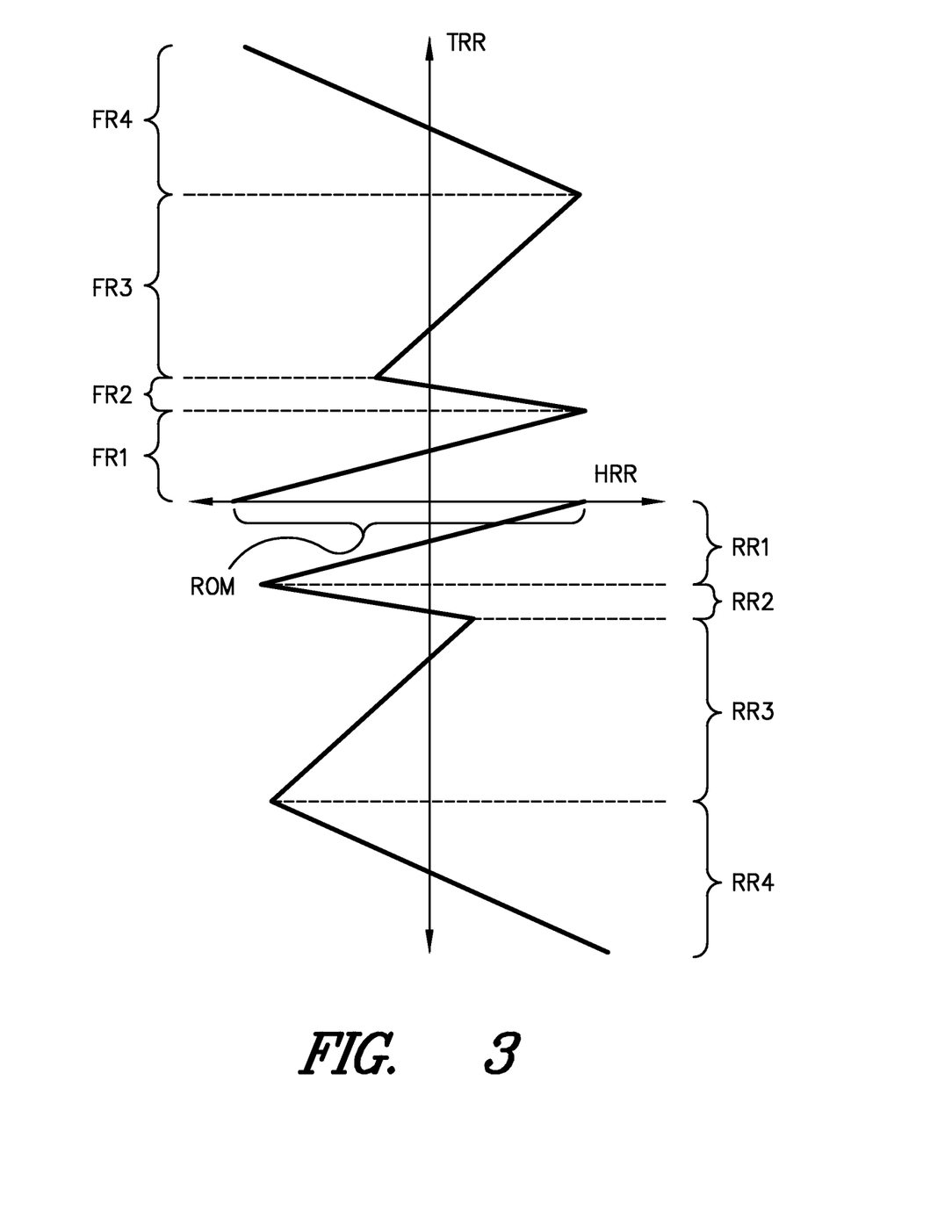
FIG. 3 illustrates a graphical representation of one embodiment of the transmission ratio verses hydrostatic power unit ratio for the transmission of FIG. 2, particularly illustrating the relationship of such ratios for the various forward and reverse speed ranges of the transmission.

Referring now to FIG. 3, a graphical representation of one embodiment of the relationship between the transmission reciprocal ratio (i.e., the transmission output speed divided by the engine speed (or the transmission input speed)), denoted TRR, and the hydrostatic power unit ratio (motor speed/pump speed), denoted HRR, of the transmission 24 is shown for the four selectable forward speed ranges and the four selectable reverse speed ranges of operation: namely, forward speed range 1 or low (denoted FRI); forward speed range 2 (denoted FR2); forward speed range 3 (FR3 forward speed range 4 (FR4); reverse speed range 1 (RR1); reverse speed range 2 (RR2); reverse speed range 3 (RR3); and reverse speed range 4 (RR4). As is generally understood, the HRR is directly related to the awash plate angle of the pump 36. Accordingly, as the awash plate is moved, the transmission ratio, and, thus, the speed of the work vehicle 10, may be varied across a given speed range.

As shown in FIG. 3, it should be noted that for each of the speed ranges, the zero tilt position of the awash plate lies between the maximum degrees of tilt in the opposite directions of movement of the awash plate. Thus, at the lowest HRR for the forward speed range FR1, the awash plate may be at or near maximum tilt in the left hand direction (which is also the zero speed ratio for the transmission for the forward direction). Similarly, at the highest ratio for the forward range FR1, the awash plate may be at or near its maximum tilt in the opposite direction (i.e., in the right hand direction). In addition, as shown in FIG. 3, to go from zero speed in the forward speed range FR1 to zero speed in the lowest speed range in the reverse direction (i.e., reverse speed range RR1), the awash plate must travel substantially its entire range of movement, as depicted by distance ROM. Thus, to perform a forward-to-reverse shuttle shift, not only must the forward and reverse directional clutches 52, 54 be swapped within the transmission 24, but the swash plate must be moved the distance ROM. It should be appreciated that, when the term "maximum" tilt is used herein, some marginal amount of swash plate movement may still remain so that zero vehicle speed can be achieved under conditions such as, but not limited to, leakage in the hydrostatic power unit 30, that may cause the motor 40 to rotate more slowly for a given swash plate angle.

Figure 4:
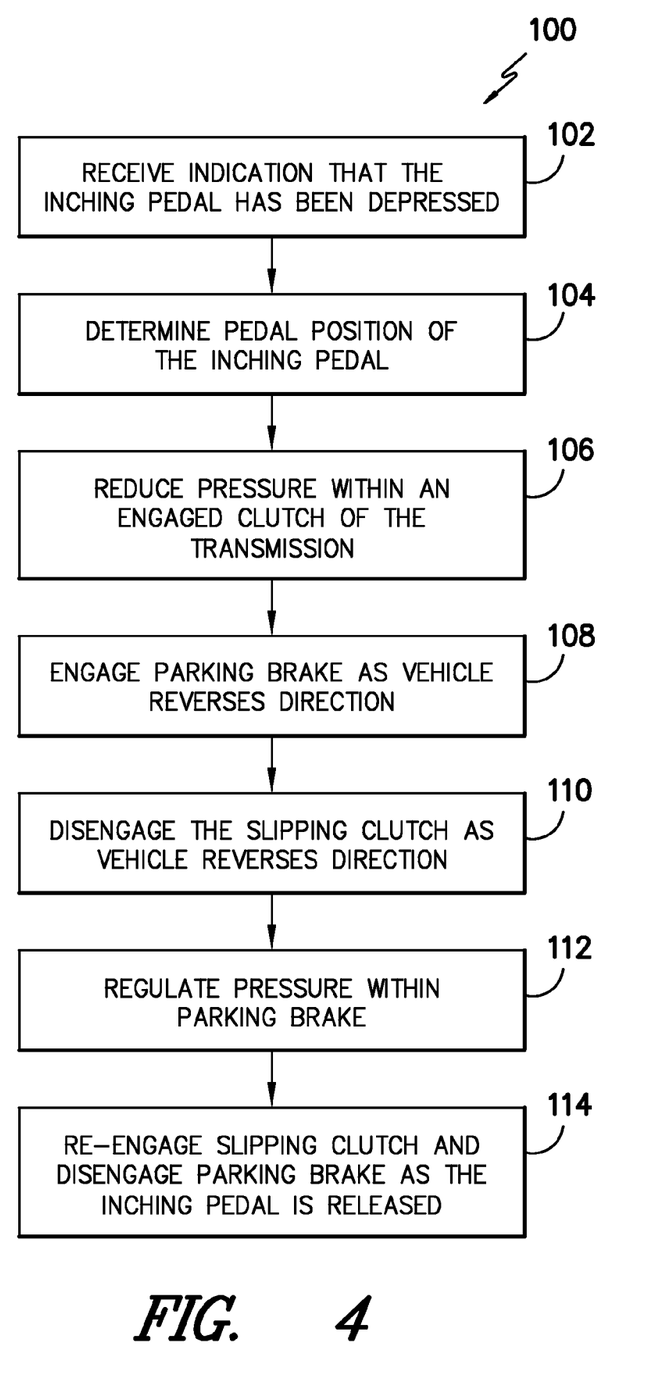
FIG. 4 illustrates a flow diagram of one embodiment of a method for controlling rollback of a work vehicle.

Referring now to FIG. 4, a flow diagram of one embodiment of a method 100 for controlling rollback of a work vehicle 10 is illustrated in accordance with aspects of the present subject matter. In general, the method 100 may be used to provide enhanced rollback control while a work vehicle 10 is traveling up an inclined surface (e.g., on a hill or any other angled surface on which the vehicle 10 may be subject to rollback while the transmission 24 is engaged) without requiring a shuttle shift to be performed. This enhanced control may, for example, allow for the inching pedal 21 of a work vehicle 10 to be depressed in order to temporarily reverse the travel direction of the vehicle 10 on the inclined surface, thereby allowing an operator to accurately position the work vehicle 10 on the inclined surface without swapping directional clutches or otherwise requiring the swash plate to be moved significantly.

It should be appreciated that, in describing the disclosed method 100, it will be assumed that the work vehicle 10 is traveling in a forward direction up an inclined surface. Thus, as used herein, "rollback" generally refers to an operating state in which the work vehicle 10 has reversed direction on the inclined surface (i.e., the vehicle 10 is now traveling in a reverse direction down the inclined surface). However, it should be appreciated that the disclosed method 100 may also be applicable in instances in which the work vehicle 10 is traveling in a reverse direction up an inclined surface. In such instances, "rollback" may occur when the work vehicle 10 reverses direction and begins traveling in a forward direction down the inclined surface.

Referring particularly to FIG. 4, the controller 44 of the work vehicle 10 may initially receive an indication that the inching pedal 21 has been depressed (102). For example, as indicated above, the controller 44 may be commutatively coupled to the inching pedal 21 and any of the other input devices 20 of the work vehicle 10. Thus, when the operator depresses the inching pedal 21, the controller 44 may be configured to receive a signal from a sensor (e.g., a position sensor) or any other suitable source indicating that the pedal 21 has been depressed.

In addition to receiving an indication that the inching pedal 21 has been depressed, the controller 44 may also be configured to determine a pedal position of the inching pedal 21 (104), in several embodiments, the controller 44 may be configured to determine the pedal position based on signals received from a position sensor or other suitable sensor associated with the inching pedal 21. For example, a characteristic of the signals received from the sensor (e.g., voltage, current, frequency and/or the like) may be varied based on the amount pedal depression, which may then be correlated to the pedal position.

As indicated above, when the inching pedal 21 is depressed, the hydraulic pressure within a currently engaged clutch of the transmission 24 may be reduced (106), For example, if the work vehicle 10 is traveling forward up an inclined surface at a low speed, the controller 44 may be configured to reduce the pressure within the forward directional clutch 52 or the range clutch R1 as the inching pedal 21 is depressed, thereby slipping the clutch and reducing the amount of torque transmitted through the transmission 24. As a result, the speed of work vehicle 10 up the inclined surface may be reduced.

In addition, to control the vehicle's rate of deceleration, the controller 44 may be configured to modulate the pressure within the slipping clutch. For instance, in several embodiments, the pressure within the slipping clutch may be regulated based on the pedal position of the inching pedal 21. Such modulation of the pressure may generally allow for the operator to accurately control the rate of deceleration of the vehicle 10 using the inching pedal 21. It should be appreciated that, as an alternative to electronically regulating the clutch pressure, the clutch pressure may be regulated mechanically based on the pedal position. For instance, in one embodiment, a direct coupling (e.g., via a hydraulic cylinder) may be provided between the inching pedal 21 and the clutch to allow the clutch pressure to be regulated based on the pedal position.

As the work vehicle 10 reverses direction and begins travel down the inclined surface while the inching pedal 21 is depressed, the controller 44 may be configured to apply or otherwise engage the parking brake 70 of the transmission 24 to control the speed at which the vehicle 10 rolls back (108). It should be appreciated that, by indicating that the parking brake 70 is engaged as the work vehicle 10 reverses direction, it is meant that the parking brake 70 may be engaged simultaneously with the vehicle 10 reversing direction or the parking brake 70 may be engaged at some time after the vehicle reverses direction. For instance, in one embodiment, the controller 44 may be configured to engage the parking brake 70 when the speed of the vehicle 10 in the reverse direction (i.e., down the inclined surface) is equal to or exceeds a predetermined speed threshold (e.g., 1 KPH).

Additionally, as the work vehicle 10 reverses direction and begins travel down the inclined surface, the controller 44 may also be configured to disengage the clutch that was initially slipped when the pedal 21 was depressed (e.g., the forward directional clutch 52 or the range clutch R1) (110), thereby allowing the parking brake 70 to carry all the torque transmitted from the wheels of the work vehicle 10. It should be appreciated that, by indicating that the slipping clutch is fully disengaged as the work vehicle 10 reverses direction, it is meant that the clutch may be disengaged simultaneously with the vehicle 10 reversing direction or the clutch may be disengaged at some time after the vehicle 10 reverses direction. For instance, the controller 44 may be configured to disengage the slipping clutch when slippage across the clutch exceeds a predetermined slip threshold. This predetermined slip threshold may, in one embodiment, be a relatively small value. For example, the predetermined slip threshold may be selected so as to correspond to an amount of slip in the clutch representing about 1 KPH of vehicle speed.

Referring still to FIG. 4, when transferring the torque-carrying function of the transmission 24 from the slipping clutch to the parking brake 70 and vice versa, the pressure within the parking brake 70 must be carefully regulated to allow for accurate control and desired operation of the work vehicle 10 (112), in particular, as indicated above, when controlling rollback, the parking brake 70 may be used for two purposes: (1) to control the rollback speed of the vehicle when the inching pedal is depressed and the torque is being carried primarily or entirely by the parking brake 70; and (2) to slow the rollback speed of the vehicle when the inching pedal is released such that the partially or fully disengaged clutch (from box 106 of FIG. 4) may be re-engaged to allow the vehicle 10 to again travel up the inclined surface.

Figure 5:
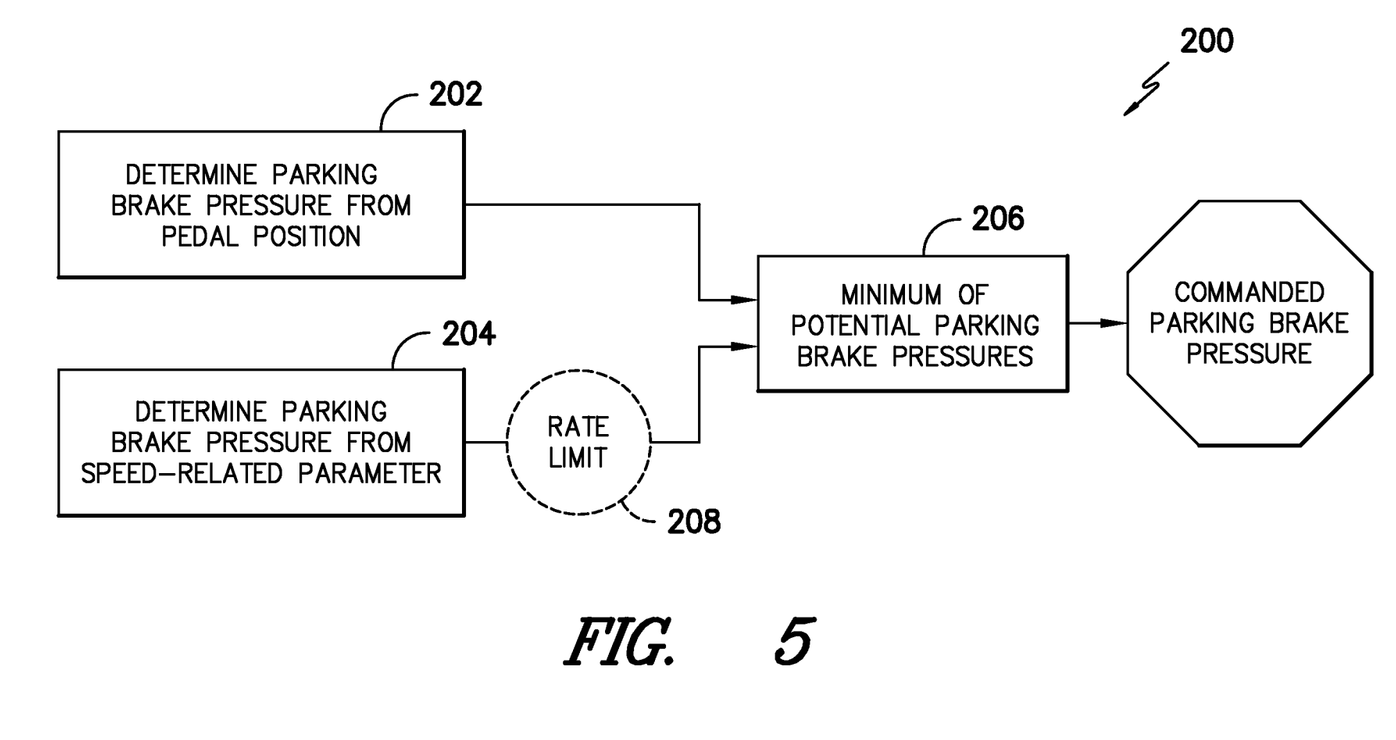
FIG. 5 illustrates a simplified flow diagram of one embodiment of a method for controlling the pressure within a parking brake of the work vehicle in accordance with the method of FIG. 4.

Given this dual purpose, the pressure within the parking brake 70 may, in several embodiments, be regulated as function of either a speed-related parameter of the work vehicle 10, such as the transmission output speed, TRR or ground speed, or the pedal position of the inching pedal 21. For example, FIG. 5 illustrates a simplified flow diagram of one embodiment of a method for controlling the pressure within the parking brake 70 during rollback. As shown, the controller 44 may be configured to determine both a potential parking brake pressure based on the pedal position of the inching pedal 21 (202) and a potential parking brake pressure based on the speed-related parameter (204). The controller 44 may then determine which of these potential pressures to apply in order to adequately control the rollback of the work vehicle 10. As shown in FIG. 5, in one embodiment, the parking brake pressure commanded by the controller 44 may correspond to the minimum pressure calculated based on the pedal position and the speed-related parameter (206), thereby ensuring that the parking brake torque is sufficient to control rollback. For instance, if the inching pedal 21 is fully depressed and all of the torque is being carried by the parking brake 70, the pressure within the parking brake 70 may generally be regulated as a function of the speed-related parameter (e.g., TRR) to ensure that the parking brake torque is sufficient to control the speed of the vehicle. However, if the inching pedal 21 is being released, the pressure within the parking brake 70 may be regulated as a function of the pedal position to ensure that the parking brake torque is sufficient to slow the vehicle 10, thereby allowing the slipping clutch to be re-engaged smoothly. For example, the parking brake torque may be increased (e.g., by decreasing the pressure) to slow rollback of the vehicle 10 down to zero speed as the inching pedal is being released. At the same time, the pressure within the clutch may be ramped up to permit the torque-carrying function of the transmission 24 to be transferred back to the clutch. The clutch may then be re-engaged and the parking brake 70 disengaged to allow the work vehicle 10 to travel back up the inclined surface (box 114 of FIG. 4).

Additionally, as shown in FIG. 5, in one embodiment, the controller 44 may optionally be configured to apply a rate limit to the parking brake pressure calculated as a function of the speed-related parameter (208). For example, the rate limit may be selected so as to prevent oscillations in the commanded pressure due to quick changes in the ground speed or in any other speed-related parameter of the work vehicle 10.

In implementing the disclosed method 100, it should be appreciated that, if the parking brake 70 is unable to control the speed of the work vehicle 10 (e.g., because the vehicle 10 is accelerating down a steep hill), the brake 70 may be disengaged to avoid damage thereto. In such case, any other suitable method known in the art may be utilized to control the speed of the vehicle 10, such as by applying the service brakes of the work vehicle 10.

Additionally, as indicated above, it should be appreciated that the disclosed method 100 may be utilized without swapping directional clutches or otherwise performing a shuttle shift. For example, when a work vehicle 10 is traveling forward up an inclined surface at a low speed, both the forward directional clutch 52 and the range clutch R1 may be engaged. By implementing the method 100 of the present subject matter, the forward directional clutch 52 may remain engaged while the range clutch R1 is slipped (or vice versa) and the parking brake 70 may be applied to control the rollback of the vehicle 10. As such, when the operator releases the inching pedal 21, the work vehicle 10 may again reverse its direction and travel forward up the inclined surface by simply re-engaging the range clutch 1 (or the forward directional clutch 52) and releasing the parking brake 70.

Moreover, it should be appreciated that the present subject matter is also directed to a system for controlling rollback of a work vehicle 10 operating on an inclined surface. In several embodiments, the system may include a transmission 24 having a directional clutch 52 (or 54), a range clutch (e.g., range clutch R1) and a parking brake 70. The transmission 24 may be configured such that the directional and range clutches are engaged as the work vehicle 10 travels up the inclined surface in a first direction (e.g., the forward direction). The system may also include an inching pedal 21 configured to be depressed by an operator of the work vehicle 10. In addition, the system may include a controller 44 communicatively coupled to the transmission 24 and the inching pedal 21. The controller 44 may be configured to receive a signal indicating that the clutch pedal 21 has been depressed, reduce a pressure within the directional clutch or the range clutch to decelerate the work vehicle 10 in the first direction and engage the parking brake 70 as the work vehicle 10 reverses direction and travels in a second direction down the inclined surface (e.g., in a reverse direction). Such a system may generally allow for controlled rollback of the work vehicle 10 without the need to engage the opposite directional clutch as the vehicle reverses direction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling rollback of a work vehicle when the work vehicle is operating on an inclined surface, the method comprising:
   receiving, by a processor-based device, a signal indicating that a pedal of the work vehicle has been depressed, the work vehicle initially traveling in a first direction up the inclined surface such that at least one clutch of a transmission of the work vehicle is engaged;
   reducing, by the processor-based device, a pressure within the at least one clutch after receiving the signal in order to decelerate the work vehicle in the first direction; and
   regulating, by the processor-based device, a pressure within a parking brake of the work vehicle as the work vehicle reverses direction and travels in a second direction down the inclined surface so as to control a rollback speed of the work vehicle in the second direction while the pedal is being depressed to provide for controlled rollback of the work vehicle.

2. The method of claim 1, further comprising determining, by the processor-based device, a pedal position of the pedal.

3. The method of claim 2, wherein reducing the pressure within the at least one clutch comprises reducing the pressure within the at least one clutch as a function of the pedal position in order to control the deceleration of the work vehicle in the first direction.

4. The method of claim 1, further comprising disengaging, by the processor-based device, the at least one clutch as the work vehicle reverses direction.

5. The method of claim 4, wherein disengaging the at least one clutch as the work vehicle reverses direction comprises disengaging the at least one clutch when slippage across the clutch exceeds a predetermined slip threshold.

6. The method of claim 1, wherein regulating the pressure within the parking brake as the work vehicle reverses direction and travels in the second direction comprises regulating the pressure within the parking brake as a function of a speed-related parameter of the work vehicle.

7. The method of claim 1, wherein regulating the pressure within the parking brake as the work vehicle reverses direction and travels in the second direction comprises regulating the pressure within the parking brake as a function of a pedal position of the pedal.

8. The method of claim 1, further comprising regulating, by the processor-based device, the pressure within the parking brake to slow the rollback speed of the work vehicle in the second direction as the pressure within the at least one clutch is increased.

9. The method of claim 1, further comprising initiating engagement, by the processor-based device, of the parking brake when the rollback speed of the work vehicle in the second direction exceeds a predetermined speed threshold.

10. The method of claim 1, wherein the at least one clutch comprises a directional clutch or a range clutch of a continuously variable transmission.

11. A system for controlling rollback of a work vehicle operating on an inclined surface, the system comprising:
    a transmission including at least one clutch, the transmission being configured such that the at least one clutch is engaged as the work vehicle travels up the inclined surface in a first direction;
    a pedal configured to he depressed by an operator of the work vehicle;
    a parking brake configured to control a rollback speed of the work vehicle; and
    a controller communicatively coupled to the transmission, the pedal and the parking brake, the controller being configured to:
      receive a signal indicating that the pedal has been depressed;
      reduce a pressure within the at least one clutch after the signal is received in order to decelerate the work vehicle in the first direction; and
      regulate a pressure within the parking brake as the work vehicle reverses direction and travels in a second direction down the inclined surface so as to control the rollback speed of the work vehicle in the second direction while the pedal is being depressed to provide for controlled rollback of the work vehicle.

12. The system of claim 11, wherein the controller is further configured to determine a pedal position of the pedal.

13. The system of claim 12, wherein the controller is configured to regulate the pressure within the at least one clutch as a function of the pedal position.

14. The system of claim 11, wherein the controller is further configured to disengage the at least one clutch as the work vehicle reverses direction.

15. The system of claim 11, wherein the controller is configured to regulate the pressure within the parking brake as the work vehicle reverses direction as a function of at least one of an output speed of the transmission or a pedal position of the pedal.

16. The system of claim 15, wherein the controller is further configured to regulate the pressure within the parking brake to slow the rollback speed of the work vehicle in the second direction as the pressure within the at least one clutch is increased.

17. The system of claim 11, wherein the controller is configured to initiate engagement of the parking brake when the rollback speed of the work vehicle in the second direction exceeds a predetermined speed threshold.

18. The method of claim 1, further comprising regulating, by the processor-based device, the pressure within the parking brake to slow the rollback speed of the work vehicle in the second direction when the pedal is released.

19. The system of claim 11, wherein the controller is configured to regulate the pressure within the parking brake to slow the rollback speed of the work vehicle in the second direction when the pedal is released.

20. The system of claim 14, wherein the controller is configured to disengage the at least one clutch when slippage across the clutch exceeds a predetermined slip threshold.

* * * * *